US006431598B2

(12) United States Patent
Saso et al.

(10) Patent No.: US 6,431,598 B2
(45) Date of Patent: Aug. 13, 2002

(54) GAS GENERATOR FOR AIRBAG

(75) Inventors: Takashi Saso; Koji Tanaka; Akihiko Kuroiwa; Norihisa Miyamoto, all of Himeji (JP)

(73) Assignees: Nippon Kayaku Kabushiki-Kaisha, Tokyo; Kabushiki Kaisha Kobe Seiko Sho, Kobe, both of (JP)

( * ) Notice: Subject to any disclaimer, the term of this patent is extended or adjusted under 35 U.S.C. 154(b) by 0 days.

(21) Appl. No.: 09/881,028

(22) Filed: Jun. 15, 2001

Related U.S. Application Data

(63) Continuation of application No. 09/284,990, filed as application No. PCT/JP97/04074 on Nov. 7, 1997, now Pat. No. 6,283,505.

(30) Foreign Application Priority Data

Nov. 14, 1996 (JP) ............................................. 8-321021

(51) Int. Cl.⁷ ............................................. B60R 21/28
(52) U.S. Cl. ....................................... 280/741; 280/736
(58) Field of Search ............................ 280/728.1, 736, 280/741, 742

(56) References Cited

U.S. PATENT DOCUMENTS

| 5,186,491 | A | * | 2/1993 | Yoshida et al. ............... 280/741 |
| 5,466,420 | A | * | 11/1995 | Parker et al. ................. 422/164 |
| 5,492,366 | A | * | 2/1996 | Osborne et al. ............... 280/741 |
| 5,649,720 | A | * | 7/1997 | Rink et al. .................... 280/737 |
| 5,773,754 | A | * | 6/1998 | Yamato ........................ 149/36 |
| 5,938,236 | A | * | 8/1999 | Tanaka et al. ................. 280/741 |
| 6,032,979 | A | * | 3/2000 | Mossi et al. .................. 280/741 |
| 6,129,381 | A | * | 10/2000 | Katsuda et al. ............... 280/741 |
| 6,135,496 | A | * | 10/2000 | Katsuda et al. ............... 280/736 |
| 6,170,869 | B1 | * | 1/2001 | Tomiyama .................... 280/741 |
| 6,183,006 | B1 | * | 2/2001 | Katsuda et al. ............... 280/736 |
| 6,283,505 | B1 | * | 9/2001 | Saso et al. .................... 280/741 |

* cited by examiner

*Primary Examiner*—Brian L. Johnson
*Assistant Examiner*—Bryan Fischmann
(74) *Attorney, Agent, or Firm*—Oblon, Spivak, McClelland, Maier & Neustadt, P.C.

(57) ABSTRACT

A gas generator for air bags for use in an air bag system for safely protecting a driver and riders in a vehicle from shock from collisions at low cost, while preventing slag in a gas flowing outside. The gas generator includes a housing (3) formed by a side cylinder (1b) with a plurality of gas exhaust openings (8) the housing being closed at its ends by an upper cap (1a) and a lower cap (2a); an igniting device (16), provided in the housing (3) at a center portion thereof; gas generating agents (6), provided in the housing (3) at a location radially outside of the igniting device (16), to be burnt to generate gas; a cooling/filtering member (7) provided in the housing (3) at a location radially outside of the gas generating agents (6) to enclose the gas generating agents and extending from the side of the upper cap (1a) to the side of the lower cap (2a); and an annular projection (50) for preventing the gas generated by the burning of the gas generating agents (6) from flowing toward an end portion of the cooling/filtering member (7). The annular projection (50) is integrally formed on at least one of the upper cap (1a) and the lower cap (2a) so as to abut with an inner peripheral surface of the cooling/filtering member (7).

8 Claims, 3 Drawing Sheets

GAS GENERATOR FOR AIRBAG

This application is a continuation of application Ser. No. 09/284,990 Filed on May 12, 1999, and now U.S. Pat. No. 6,283,505 which is a 371 of PCT/JP97/04074 filed Nov. 7, 1997.

TECHNICAL FIELD

The present invention relates to a gas generator for air bags (hereinafter it is simply referred to as "gas generator") for use in an air bag system for safely protecting a driver and riders in a vehicle from shock from collisions. Particularly, the present invention relates to a gas generator of cost efficiency having capabilities of maintaining the performance capability of preventing slag in a gas flowing outside.

BACKGROUND ART

The gas generators of this type include the one having a housing construction of the so-called single cylinder type and the one having a housing construction of the so-called double cylinder type.

These housing constructions include a welded one and a friction welded one. Either of these two types of gas generators have the following fundamental construction. That is to say, these gas generators have a housing formed by a side cylinder having a plurality of gas exhaust openings; an upper cap closing an upper end of the side cylinder; and a lower cap closing a lower end of the side cylinder.

The housing contains therein an igniter, gas generating agents, and a cooling/filtering member, which are arranged in this order from the center of the housing in a radially outward direction. The cooling/filtering member is formed to enclose the gas generating agents, extending from the upper cap side to the lower cap side.

In the gas generator having this fundamental construction, pressure of the gas generated in the housing rises instantaneously to inflate an air bag at the time of activation of the gas generator, according to the types of gas generating agents or burning conditions. As a result of this, looseness may occur in both end portions of the cooling/filtering member in abutment with the upper cap and the lower cap, then degrading of the hermeticity of the cooling/filtering member at the ends abutting with the upper and lower caps, and as such may cause the slag in the gas to flow outside.

The inventors of this application previously applied for patent in respect of a gas generator having the construction of preventing the slag in gas from flowing outside even when the gas pressure rises instantaneously (Japanese patent application No. Hei 8(1996)-207929)

Specifically, the previously proposed gas generator has, as shown in FIG. 3, a housing 33 composed of an upper container 31 having a side cylinder 31b having a plurality of gas exhaust openings 38; an upper cap 31a closing an upper end of the side cylinder 31b; and a lower container 32 having a lower cap 32a closing a lower end of the side cylinder 31b. The housing 33 includes therein an igniter 70 having an ignitor element 71 and an inflammation agent 72 sealed by barrier 35, gas generating agents 36, and a cooling/filtering member 37, which are arranged in this order from the center of the housing to a radially outside thereof. The cooling/filtering member 37 is formed to extend from the side of the upper cap 31a to the side of the lower cap 32a.

Further, the housing 33 has therein metallic foil 39, bypass preventing members 45, 46 and sealing members 40a, 40b. The metallic foil 39 adheres on an inner wall of the side cylinder 31b to cap the gas exhaust openings 38 from the inside. The bypass preventing members 45, 46 are provided at the opposite ends of the cooling/filtering member 37. The bypass preventing members 45, 46 have a L-shaped section, contacting with an inner surface of the cooling/filtering member 37 at the opposite end portions thereof and with inner surfaces of the upper and lower caps 31a, 32a. To ensure the effect of preventing the slag from flowing outside, the sealing members 40a, 40b are provided at end surfaces of the cooling/filtering member 37.

With the gas generator thus constructed, even when the gas pressure in the housing rises instantaneously to inflate the housing, since the bypass preventing members 45, 46 are located at the opposite ends of the cooling/filtering member 37, the slag in the gas can be prevented flowing outside. However, disadvantageously, the gas generator thus constructed has more parts and thus increased costs, due to the provision of the bypass preventing members 45, 46. Particularly in the circumstance in which specs on air bag systems are being standardized, cost reduction is being increasingly requested for gas generators, so cost increase resulting from the increase in component count is a significant drawback.

Accordingly, it is the object of the present invention to provide an improved gas generator at a low cost by improving the construction of inner surfaces of the upper and lower caps 31a, 32a to produce the function that is equal to or better than the function of the bypass preventing members 45, 46 of preventing the slag in the gas from flowing outside through the cooling/filtering member 37, thereby eliminating the need of the bypass preventing members 45, 46 to provide reduction of component count and a resultant improved efficiency in assembling work.

DISCLOSURE OF THE INVENTION

A gas generator for air bags of the present invention comprises a housing formed by a side cylinder with a plurality of gas exhaust openings being closed at its ends by an upper cap and a lower cap; an ignitor, provided in the housing at a center portion thereof, to generate a flame; gas generating agents, provided in the housing at a location radially outside of the to ignitor, to be burnt by the flame to generate gas; a cooling/filtering member provided in the housing at a location radially outside of the gas generating agents to enclose the gas generating agents and extending from the side of the upper cap to the side of the lower cap; and an annular projection for preventing the gas generated by the burning of the gas generating agents from flowing toward an end portion of the cooling/filtering member, the annular projection being integrally formed on at least one of the upper cap and the lower cap so as to abut with an inner peripheral surface of the cooling/filtering member.

This produces the gas generator having, as compared with the gas generator as illustrated in FIG. 3, the feature that the bypass preventing members are replaced by the annular projection integrally formed with the upper cap or the lower cap, thus providing reduced component count as compared to the gas generator of FIG. 3.

The annular projection has the same function of preventing the gas flowing toward the end portion of the cooling/filtering member as the bypass preventing members, and as such can allow a full amount of gas to pass through the entire cooling/filtering member except the end portion thereof. Further, when an instantaneous pressure rise occurs at the time of burning, the annular projection is pressed toward the cooling/filtering member, and as such can produce the operation and effect of a further increased degree of contact between the end surface of the annular projection at the outer diameter side thereof and the end surface of the cooling/filtering member at the inner diameter side thereof. This enables the slag in the gas to be prevented from outside more reliably. This can achieve a gas generator having improved cost efficiency resulting from the reduced component count and the resultant improved assembling workability, while fully maintaining its performance capability of reliably preventing the slag in the gas flowing outside within a permissible range, without using any bypass preventing members shown in FIG. 3 and irrespective of the types of gas generating agents and the burning conditions.

The gas generator for air bags of the present invention may take the embodied form that the side cylinder and the upper cap are integrally formed and the side cylinder and the lower cap are joined to each other by friction welding, to thereby form the housing.

This embodied form provides the following result. When the housing is formed by friction welding, it is difficult to bring the side cylinder and the lower cap into full contact with each other in a uniform condition, and as such may often produce the housing with a gap developing at the opposite ends of the cooling/filtering member. However, even in the gas generator having such a housing, since the projection means prevents the gas flowing toward the end portion, the slag can be, prevented from flowing outside.

Also, the gas generator for air bags of the present invention may take the embodied form that the side cylinder of thin-plate and the upper cap are integrally formed and the side cylinder and the lower cap are joined to each other by welding, to thereby form the housing.

This embodied form provides the following result. The housing having the thin-plate welded structure is easily deformed by the pressure resulting from the gas generated, and as such may often produce the housing with a gap developing between the end of the cooling/filtering member and the cap. However, even in the housing thus structured, since the projection means prevents the gas flowing toward the end portion, the slag can be well prevented flowing outside.

In the gas generator for air bags of the present invention, it is preferable that a space is formed between the cooling/filtering member and the side cylinder.

This provides the following results. The gas is held in the space formed between the cooling/filtering member and the side cylinder prior to being exhausted to the outside passing through the gas exhaust openings, whereby the gas is rendered uniform in pressure in the space. As a result of this, occurrence of the phenomenon of the gas locally passing through the cooling/filtering member toward the gas exhaust openings is prevented, and as such can allow the gas to pass through the entire cooling/filtering member generally uniformly. Thus, although the gas is prevented from directly flowing into the cooling/filtering member at the end thereof by the annular projection, after flowing from a center portion of the cooling/filtering member into the interior thereof, the gas is allowed to easily pass through the cooling/filtering member at the end portion thereof which is located at the back side of the end surface of the projection means at the outer diameter side thereof. This provides an improved efficiency of use of the cooling/filtering member, and as such can achieve size reduction of the cooling/filtering member. As a result of this, size reduction and weight reduction of the gas generator can be realized.

Further, the gas generator for air bags of the present invention may take the embodied form that the housing is provided, around the ignitor, with a center cylinder for joining the upper cap and the lower cap.

With the construction in which the center cylinder for joining the upper cap and the lower cap is provided around the ignitor, the housing is increased in rigidity and thus is made resistant to deformation even when the gas pressure rises at the burning of the gas generating agents. Accordingly, the annular projection can be made relatively small, and resultantly the material costs required for the upper cap and the lower cap can be saved and also the processing time can be shortened, thus providing reduced manufacturing costs.

For the gas generator for air bags of the present invention, it is preferable that the cooling/filtering member has a wall thickness portion to abut with an inner wall surface of the side cylinder.

This provides the result that the pressure of the gas generated presses the cooling/filtering means toward the side cylinder and, as a result, the wall thickness portion is pressed against the side cylinder and is brought into firm contact with it. This enables the slag to be reliably prevented from flowing outside through the gas exhaust openings.

Further, in the gas generator for air bags of the present invention, the gas exhaust openings are hermetically sealed with aluminum foil.

This can provide the result that the combustion pressure can be controlled by, for example, adjusting the thickness of the aluminum foil and also degradation of the gas generating agents resulting from their moisture proof can be prevented.

BEST MODE FOR CARRYING OUT THE INVENTION

The embodiments of the present invention will be described below with reference to the drawings.

Figure 1:
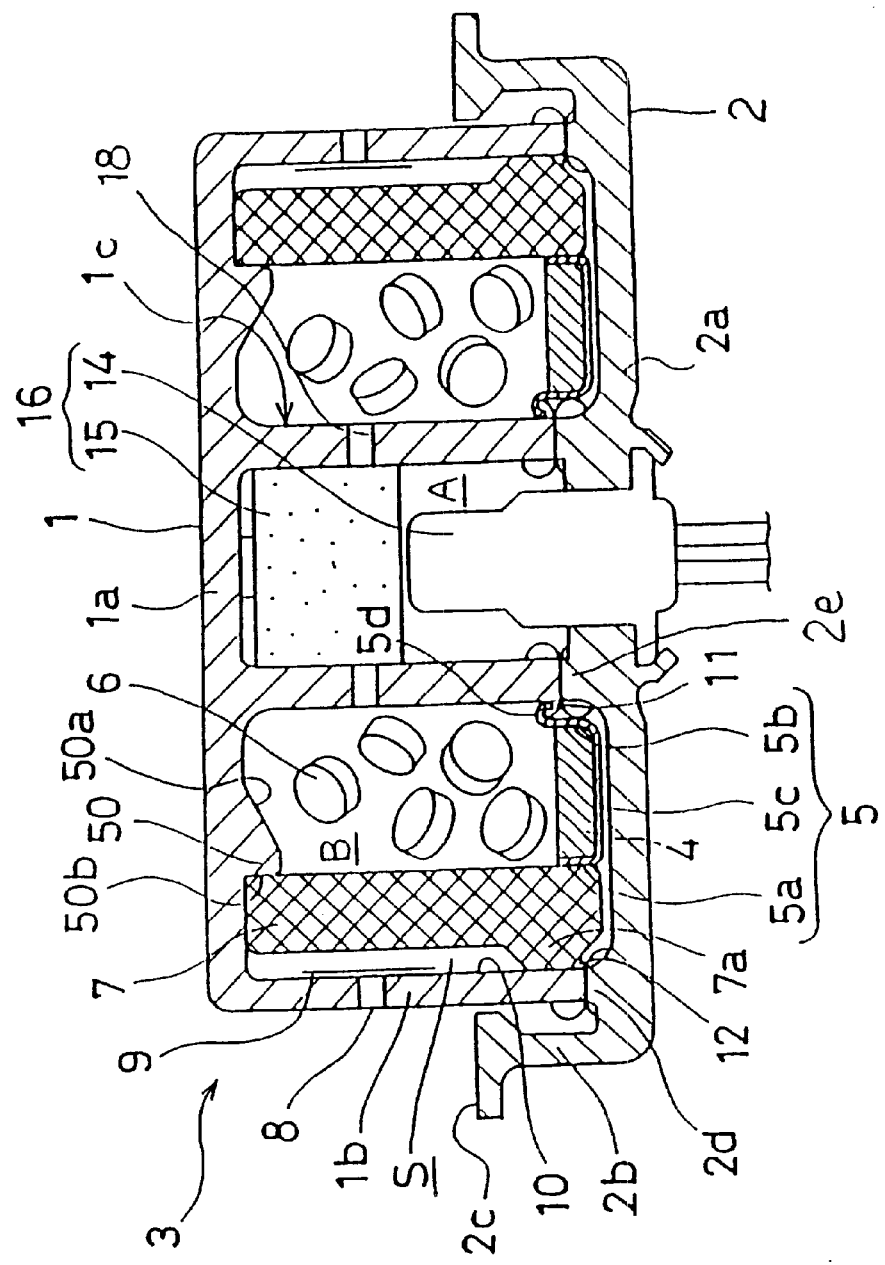
FIG. 1 is a sectional view of one embodiment of the present invention.

FIG. 1 is a conceptual sectional view of one embodiment of the present invention. As shown in FIG. 1, the gas generator has a housing 3 made of aluminum. The housing 3 is composed of an upper container 1 and a lower container 2. The upper container 1 has an upper cap 1a; a side cylinder 1b extending downwardly from a periphery of the upper cap 1a; and a center cylinder 1c extending downwardly from a lower surface of the upper cap 1a at the inside thereof. The side cylinder 1b and the center cylinder 1c are thin-plate form and are joined to the lower container 2 at the lower ends thereof by friction welding.

The lower container 2 is composed of a lower cap 2a, a flanged cylinder 2b and a side flange 2c. A first step portion 2e to which the center cylinder 1c is joined is formed on an upper surface of the lower cap 2a at an inside thereof, and a second step portion 2d to which the side cylinder 1b is joined is formed on the upper surface of the lower cap at an outside thereof. The flanged cylinder 2b extends upwardly from a periphery of the lower cap 2a to enclose the side cylinder 1b of the upper container 1, and the side flange 2c extends horizontally from an upper end of the flanged cylinder 2b.

The gas generator having the housing 3 thus constructed is what is called the double cylinder type of gas generator having the friction welded housing construction, having an igniting chamber A enclosed by the center cylinder 1c and a gas generating chamber B enclosed by the center cylinder 1c and the side cylinder 1b. The center cylinder 1c has a side surface forming therein a plurality of circumferentially arranged flame exhausting holes 18 through which the igniting chamber A is communicated with the gas generating chamber B. The side cylinder 1b has a side surface forming therein a plurality of circumferentially arranged gas exhaust openings 8 through which the gas generating chamber B is communicated to the outside. In the igniting chamber A, an igniting device 16 composed of an inflammation agent 15 and an igniter 14 is disposed to generate flames. In the gas generating chamber B are housed gas generating agents 6 from which gas is evolved by the flames. This produces the result that when the inflammation agent 15 is ignited in the igniting chamber A, the flames pass through the flame exhausting holes 18 to burn the gas generating agents 6, so as to evolve the gas therefrom. Then, the gas is exhausted to the outside through the gas exhaust openings 8.

The gas generating agents 6 are packed in the housing ranging from the side of the upper cap 1a of the upper container 1 to the side of the lower cap 2a of the lower container 2. A cap 5, which can be called as a covering member for the gas generating agents, is interposed between the gas generating agents 6 and the lower cap 2a. The cap 5 has a bottom portion 5c located near and extending along the upper surface of the lower cap 2a; a short outer cylinder portion 5a extending upwardly from an outer periphery of the bottom portion 5c; and a short inner cylinder portion 5b extending upwardly from an inner periphery of the bottom portion 5c. The short inner cylinder portion 5b has a tip 5d formed by being bent toward the center cylinder 1c. The tip 5d is fixed by means of a press-contacting burr 11 produced in the outer surface of the center cylinder 1c at the time of friction welding. The cap 5 is provided with a cushion material 4 having resiliency. The cushion material 4 fixedly holds the gas generating agents 6, contacting with the gas generating agents 6.

The gas generating agents 6 are enclosed with the cooling/filtering member 7 which can allow only the gas to pass through it. The cooling/filtering member 7 is provided extending from the side of the upper cap 1a to the side of the lower cap 2a and is formed into a cylindrical form opening at the opposite ends. The cooling/filtering member 7 has at a lower part thereof a wall thickness portion 7a having a larger outer diameter than the remaining parts. The wall thickness portion 7a has a nose end surface, an upper slant surface and a lower slant surface, and the nose end surface is press-fitted into an inner peripheral surface of the side cylinder 1b. The lower slant surface abuts with a press-contacting burr 12 produced in the inner surface of the side cylinder 1b at the time of friction welding. This provides the result that the wall thickness portion 7a is compressed by the side cylinder 1b, while abutting with the press-contacting burr 12, and thereby the cooling/filtering member 7 is brought into intimate contact with the side cylinder 1b to be fixed thereto. This can produce the result that when the gas is generated, the slag in the gas can surely be prevented flowing outside from the outer peripheral surface of the cooling/filtering member 7 at a lower part thereof in the housing 3.

An inner peripheral surface of the cooling/filtering member 7 at an upper end portion thereof abuts with an annular projection 50, and an inner peripheral surface of the cooling/filtering member 7 at a lower end portion thereof abuts with the short outer cylinder portion 5a of the cap 5. The annular projection 50 is integrally formed on a lower surface of the upper cap 1a of the upper container 1 and has a section of a generally right angled triangle formed by a slant surface 50a at the inner diameter side and a vertical surface 50b at the outer diameter side. The vertical surface 50b abuts with the inner peripheral surface of the cooling/filtering member 7 and thereby has the function of positioning the cooling/filtering member 7 and of preventing the gas flowing near the inner peripheral surface at the upper end portion of the cooling/filtering member 7 from passing through the upper end portion of the same.

This provides the result that at the time of burning, an upper layer of gas generated in the gas generating chamber B is introduced to a center portion of the cooling/filtering member 7, except the upper end portion thereof, to pass through the center portion by the slant surface 50a of the annular projection 50. As a result of this, there is almost no fear of the slag flowing outside from a gap between the upper end portion of the cooling/filtering member 7 and the upper cap 1a. In addition, even when a force acting in a direction for the inner surface of the upper cap 1a and the upper end portion of the cooling/filtering member 7 to be moved away from each other is caused by the instantaneous pressure rise in the housing at the burning, since the gas is sealed out in the part of the vertical surface 50b of the annular projection 50, the slag is prevented flowing outside from the gap between the upper end portion of the cooling/filtering member 7 and the upper cap 1a.

The cooling/filtering member 7 defines a space S as a gas dome between the outer surface of the cooling/filtering member 7 and the inner peripheral surface of the side cylinder 1b. The width of the space S is set to be circumferentially uniform, particularly at the location of the gas exhaust openings 8. The space S operates to render the gas generated by the burning of the gas generating agents uniform, to prevent a drifting phenomenon of the gas flowing locally into the cooling/filtering member 7 toward the gas exhaust openings 8 of minimum pressure, so as to allow the gas to pass through the entire cooling/filtering member 7 generally evenly. As a result of this, despite of the provision of the annular projection 50 by which the gas is introduced to the center portion of the cooling/filtering member 7, the gas tends to flow also to the upper portion of the cooling/filtering member 7 located at the back side of the vertical surface 50b at the outer diameter side of the projection 50. This can provide increased efficiency of use of the cooling/filtering member 7 to fully meet the demand of reduction in size and weight of the gas generator.

Aluminum foil 9 adheres on the inner peripheral surface 10 of the side cylinder 1b at a location corresponding to the gas exhaust openings 8. The aluminum foil 9, by means of which the gas exhaust openings 8 are hermetically sealed, enables the burst pressure or the combustion pressure of the gas generating agents 6 to be controlled by adjusting its thickness, for example, and also prevents degradation of the gas generating agents 6 resulting from their moisture proof.

Additionally, sealing members (equivalent to 40a in FIG. 3) may be provided between the cooling/filtering member 7 and the upper cap 1a and between the cooling/filtering member 7 and the lower cap 1b, respectively. This can produce the result of the slag being prevented flowing outside from the gap between the upper end of the cooling/filtering member 7 and the upper cap 1a more reliably.

In the construction above, after the upper container 1 is made ready for assembly of the gas generator, the gas exhaust openings 8 in the upper container 1 are sealed by the aluminum foil 9. Thereafter, the inflammation agent 15 is charged in the igniting chamber A, and then the cooling/filtering member 7 is press-fitted into the gas generating chamber B to abut against the vertical surface 50b of the annular projection 50. Then, the gas generating agents 6 are packed in the inner periphery portion of the cooling/filtering member 7 and then are fixed by pressing the cap 5 onto the upper surface of the gas generating agents 6.

Then, after abutted with the side cylinder 1b and the center cylinder 1c of the upper container 1, the lower container 2 is rotated, keeping the upper container 1 in a fixed state, whereby the lower container 2 and the upper container 1 are joined to each other by friction welding. Thereafter, the igniter 14 is fixed to the lower container 2 to complete the assembly of the gas generator. This assembly can provide reduced number of assembling processes, as compared with the conventional assembly shown in FIG. 3 in which the bypass preventing member 45 is fixed to the upper end portion of the gas generator, and thus can provide reduced costs required for the assembly.

The gas generator assembled in the above-said assembling steps is activated by supplying an igniting current to the igniter 14. When the igniter 14 is ignited by the supply of the igniting current and the flames burn the inflammation agent 15, the flames in the igniting chamber A pass through the flame exhaust holes 18 into the gas generating chamber B, to burn the gas generating agents 6 so as to generate gas. When the gas generated in the gas chamber B passes through the cooling/filtering member 7 into the space S and the internal pressure reaches a preset pressure, the aluminum foil 9 is ruptured to open the gas exhaust holes 8, so that the gas is exhausted out from the gas exhaust holes 8.

The gas existing at the side of the upper cap 1a (the upper layer of gas) moves along the slant surface 50a of the annular projection 50, so that it is introduced into the center portion of the cooling/filtering member 7 by the slant surface. Also, the gas presses the annular projection 50 toward the cooling/filtering member 7, so that the vertical surface 50b of the annular projection 50 and the cooling/filtering member 7 are firmly abutted with each other. As a result of this, even if a gap is formed between the upper end surface of the cooling/filtering member 7 and the upper cap 1a due to a pressure rise in the gas generating chamber B, there is almost no fear of the slag flowing outside through such a gap.

Also, if a gap develops between the cooling/filtering member 7 and the cap 5, the slag will move into between the lower surface of the cooling/filtering member 7 and the lower cap 2a. At that time, the wall thickness portion 7a is brought into firm contact with the side cylinder 1b and the press-contacting burr 12, because the wall thickness portion 7a of the cooling/filtering member 7 is abutted with the side cylinder 1b and the press-contacting burr 12 and because the gas pressure presses the cooling/filtering member 7 toward the side cylinder 1b and the press-contacting burr 12. Therefore, even if such a gap develops between the cooling/filtering member 7 and the cap 5, the slag cannot move into the space S and, as a result, cannot be allowed to flow outside through the gas exhaust openings 8.

Then, as a result of the gas arriving at the space S being rendered uniform in pressure in the space S, the gas passing through the cooling/filtering member 7 flows in generally uniform density throughout the cooling/filtering member 7, and as such can allow the gas to easily pass through the cooling/filtering member 7 at the upper end portion thereof as well which is located at the back side of the vertical surface 50b at the outer diameter side of the annular projection 50.

Figure 3:
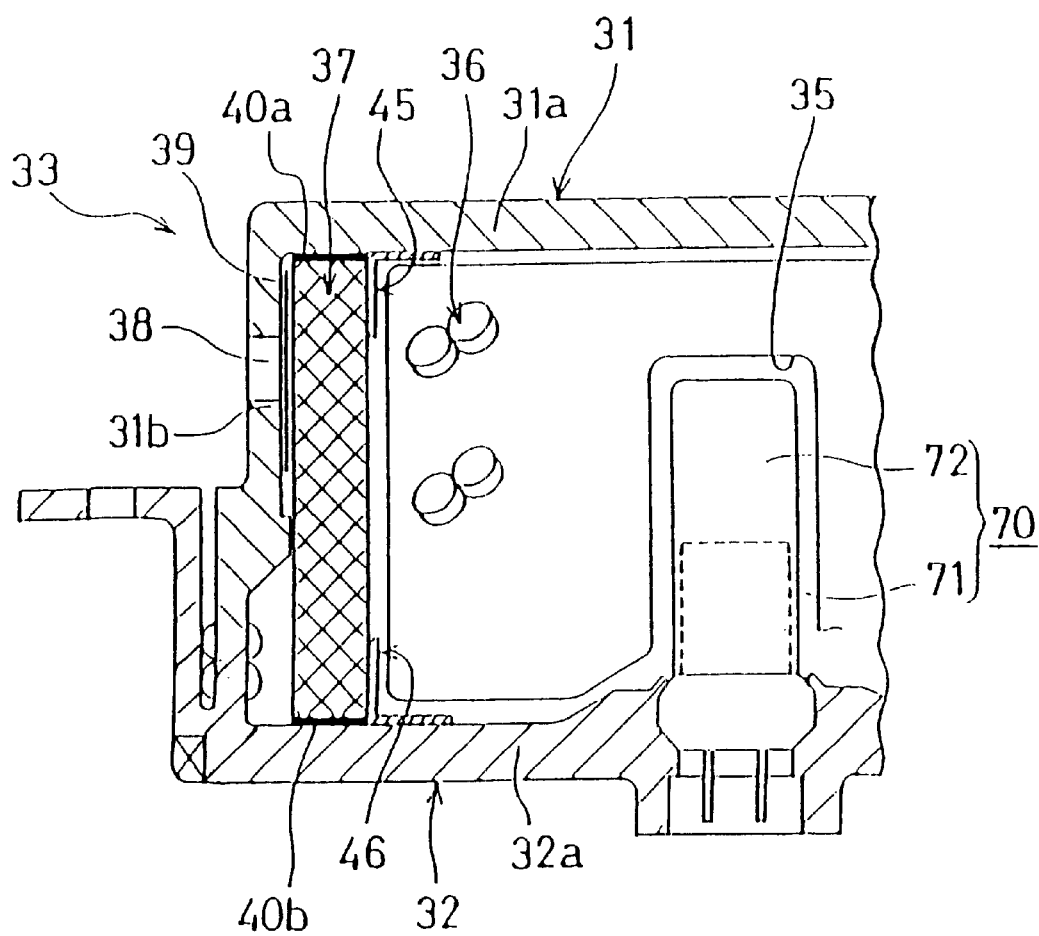
FIG. 3 is a sectional view of a part of a conventional type of gas generator.

As mentioned above, in the conventional type of gas generator shown in FIG. 3, the bypass preventing members are required to be set in place and thus the assembling work has to be done at much expense in time and effort and with care, for the reason of which the assembling work is not necessarily easy and thus has room for improvement in productivity. According to the gas generator of the illustrated embodiment of the invention, the assembling work can be simplified to the extent to which the bypass preventing members can be eliminated, so that the productivity can be improved. This provides a gas generator having improved cost efficiency associated with the improved assembling workability resulting from the reduced component count, while maintaining its good performance capability of preventing the slag flowing outside.

Figure 2:
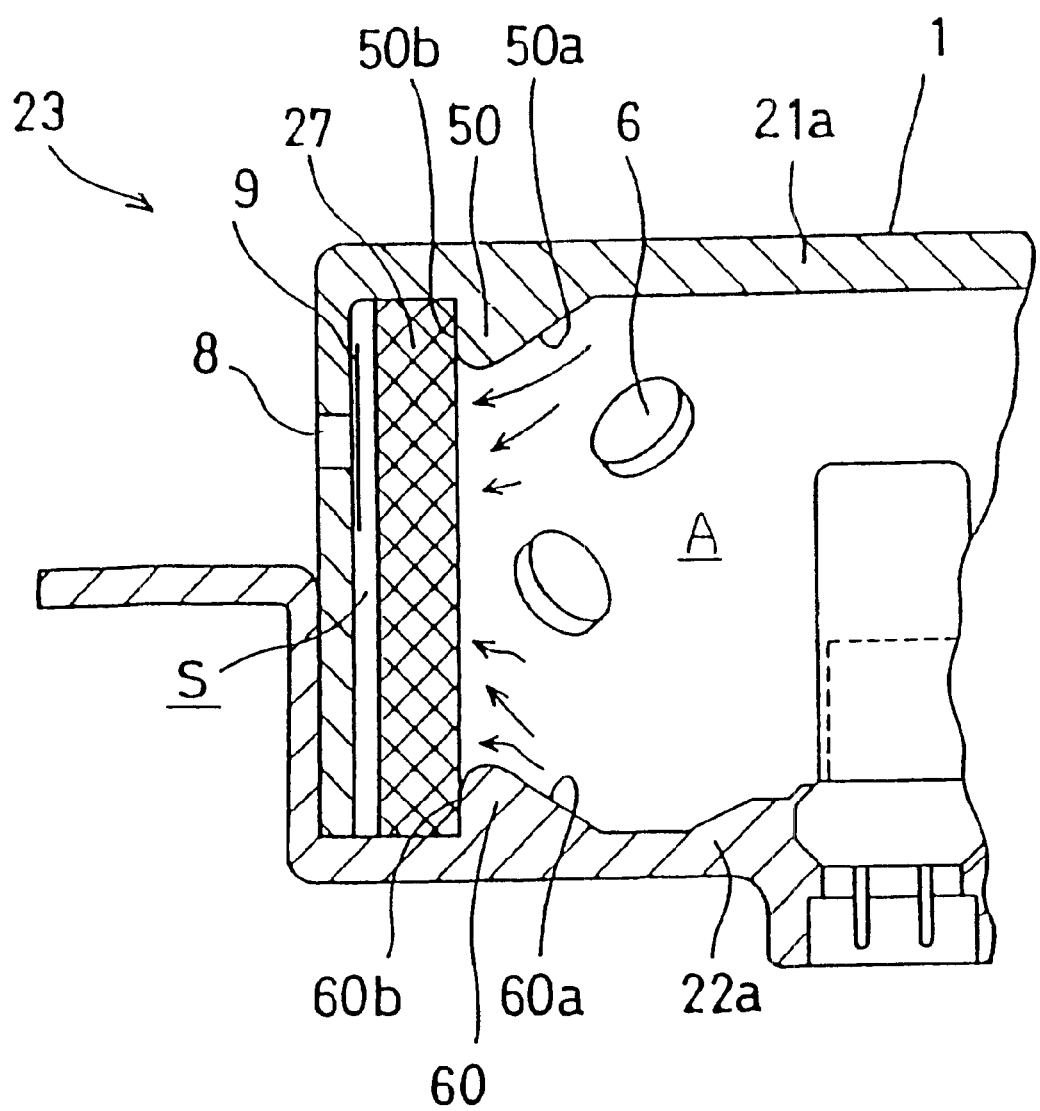
FIG. 2 is a sectional view of a part of another embodiment of the present invention.

Referring now to FIG. 2, another embodiment of the present invention will be described. The gas generator shown in FIG. 2 is the single cylinder type of gas generator having a welded structure. When compared with the embodiment of FIG. 1, the embodiment of FIG. 2 is mainly characterized in that there is not provided the center cylinder 1c of FIG. 1 and that the same construction as the annular projection 50 formed in the upper cap 1a is adopted in the lower cap as well.

Speaking to the construction of the annular projection 60 adopted in the lower cap as well, in FIG. 2, the annular projection 60 is integrally formed on a upper surface of the lower cap 22a and has a section of a generally right angled triangle formed by a slant surface 60a at the inner diameter side and a vertical surface 60b at the outer diameter side. The annular projection is located so that the vertical surface 60b at the outer diameter side thereof can abut with the inner surface of a cooling/filtering member 27 at the lower end thereof. This provides the result that the gas generated in the gas generating chamber flows along the slant surface 50a of the upper annular projection 50 and the slant surface 60a of the lower annular projection 60 as indicated by arrows and is all introduced to a center portion of the cooling/filtering member 27, except the upper and lower end portions thereof, to pass through the center portion. As a result of this, despite of the construction eliminating therefrom the bypass preventing members used hitherto, there is almost no fear of the slag flowing outside from gaps developing at the upper and lower end portions of the cooling/filtering member 27.

This provides the result that the gas generated in the gas generating chamber B flows along the slant surface 50a of the upper annular projection 50 and the slant surface 60a of the lower annular projection 60 as indicated by arrows and is all introduced to a center portion of the cooling/filtering member 27, except the upper and lower end portions thereof, to pass through the center portion. As a result of this, despite of the construction eliminating therefrom the bypass preventing members used hitherto, there is almost no fear of the slag flowing outside from gaps developing at the upper and lower end portions of the cooling/filtering member 27.

In the gas generator of this embodiment as well, sealing members (which are equivalent to 40a, 40b of FIG. 3) may additionally be provided between the upper end portion of the cooling/filtering member 27 and the upper cap 21a and between the lower end portion of the cooling/filtering member and the lower cap 22a, respectively.

According to the gas generator of this embodiment, the bypass preventing members in the gas generator of FIG. 3 are not at all required, so the assembling work of the gas generator can be done with improved efficiency. As a result of this, the gas generator can be realized at a lower cost and improved assembling work efficiency.

The section form of the annular projection 50, 60 is not limited to the illustrated ones in FIGS. 1 and 2. Modifications, including, for example, varying the size, forming the vertical surface 50b or 60b into a curved surface, varying the angle of the vertical surface, forming the slant surface 50a or 60a at the inner diameter side into a curved surface and forming it into a stepped surface, are a matter of design choice, in consideration of gas generating agents used and burning conditions.

In the discussion above, the friction-welded housing structure having two outer and inner side cylinders is illustrated in FIG. 1 as the housing construction to which the concept of the bypass preventing mechanism embodied by the annular projection is applicable, though such concept may of course be effectively applied to the welded housing structure and the friction-welded housing structure of a single cylinder. In addition, the welded housing structure having the single side cylinder is illustrated in FIG. 2, though the concept of the invention is of course applicable to the housing structure of double cylinder type. The materials which may be used for the welded housing structure include metallic materials, such as stainless steel, in addition to aluminum.

As seen from the foregoing, the gas generator of the embodiment as illustrated in for example FIG. 1 includes the housing 3 formed by the side cylinder 1b having a plurality of gas exhaust openings 8 being closed at the ends thereof by the upper cap 1a and the lower cap 2a; the igniting device 16, provided in the housing 3 at a center part thereof, to generate a flame; the gas generating agents 6, provided in the housing 3 at a location radially outside of the igniting device 16, to be burnt by the flame and generate gas; the cooling/filtering member 7, provided in the housing 3 at a location radially outside of the gas generating agents 6 and extending from the side of the upper cap 1a to the side of the lower cap 2a, to enclose the gas generating agents 6; and the annular projection 50 for preventing the gas generated by the burning of the gas generating agents 6 from flowing toward the ends of the cooling/filtering member 7, the annular projection 50 being integrally formed on at least one of the upper cap 1a and the lower cap 2a so as to abut with the inner peripheral surface of the cooling/filtering member 7.

As a result of this, the inventive gas generator has, as compared with the gas generator as illustrated in FIG. 3, the feature that the bypass preventing members are substituted by the annular projection 50 integrally formed with the upper cap 1a or the lower cap 2a, thus providing reduced component count compared to the gas generator of FIG. 3.

The annular projection 50 has the same function of preventing the gas flowing toward the end of the cooling/filtering member 7 as the bypass preventing members, and as such can allow a full amount of gas to pass through the entire cooling/filtering member 7 except the opposite end portions thereof. Further, when an instantaneous pressure rise occurs in the housing, the gas generated presses the annular projection 50 toward the cooling/filtering member 7, and as such can produce the operation and effect of a further increased degree of contact between the end surface of the annular projection 50 at the outer diameter side thereof and the end surface of the cooling/filtering member 7 at the inner diameter side thereof. This enables the slag in the gas to be prevented flowing outside more reliably. This can achieve the gas generator having improved cost efficiency resulting from the reduced component count and the resultant improved assembling workability, while fully maintaining its performance capability of reliably preventing the slag flowing outside within a permissible range, without using any bypass preventing members and irrespective of the types of gas generating agents 6 and the burning conditions.

When the gas generator has the construction that the space S is formed between the cooling/filtering member 7 and the side cylinder 1b, the gas is reserved in the space S formed between the cooling/filtering member 7 and the side cylinder 1b prior to being exhausted to the outside passing through the gas exhaust openings 8, whereby the gas is rendered uniform in pressure in the space S. As a result of this, occurrence of the phenomenon of the gas locally passing through the cooling/filtering member 7 toward the gas exhaust openings 8 is prevented, and as such can allow the gas to pass through the entire cooling/filtering member 7 generally uniformly. Thus, although the gas is prevented directly flowing into the cooling/filtering member 7 at the ends thereof by the annular projection 50, after flowing from a center portion of the cooling/filtering member 7 into the interior thereof, the gas is allowed to pass through the entire cooling/filtering member 7 generally uniformly, as mentioned above. This improves the flow of the gas into the end portion of the cooling/filtering member 7 located at the back side of the end surface of the annular projection 50 at the outer diameter side thereof, thus providing an improved efficiency of use of the cooling/filtering member 7. As a result of this, size reduction and weight reduction of the gas generator can be realized.

With the construction in which the side cylinder 1b is integrally formed with the upper cap 1a and also is joined to the lower cap 2a by friction welding to thereby form the housing 3 of the gas generator, it is generally difficult to bring the side cylinder 1b and the lower cap 2a into full contact with each other in a uniform condition, and as such may often produce the housing 3 with a gap developing at the opposite ends of the cooling/filtering member 7. However, despite of the gas generator having the thus formed housing 3, since the projection 50 prevents the gas flowing toward the end portion, the slag can be well prevented from flowing outside.

With the construction in which the thin-plate-like side cylinder 1b is integrally formed with the upper cap 1a and also is joined to the lower cap 2a by welding to thereby form the housing 3 of the gas generator, the housing 3 having the thin-plate welded structure is easily deformed by the pressure resulting from the gas generated, and as such may often produce the housing 3 with a gap developing at the end of the cooling/filtering member 7. However, even in this case, since the projection 50 prevents the gas flowing toward the end portion, the slag can be well prevented flowing outside.

With the construction in which the center cylinder for joining the upper cap 1a and the lower cap 2a is provided around the igniting device 16 of the housing 3, the housing 3 is increased in rigidity and is made resistant to deformation even when the gas pressure rises at the burning of the gas generating agents 6. Accordingly, the annular projection 50 can be made relatively small, and resultantly the material costs required for the upper cap 1a and the lower cap 2a can be saved and also the process time can be shortened to reduce the manufacturing costs.

In the case where the cooling/filtering member is provided with the wall thickness portion to abut with the inner wall surface of the side cylinder, the pressure of gas generated presses the cooling/filtering member 7 toward the side cylinder 1b. As a result, the wall thickness portion is pressed against the side cylinder 1b and is brought into firm contact with it, so that the slag is prevented from flowing outside through the gas exhaust openings 8.

With the gas generator having the construction in which the gas exhaust openings 8 are hermetically sealed with the aluminum foil 9, the combustion pressure can be controlled by adjusting the thickness of the aluminum foil 9 and also degradation of the gas generating agents 6 resulting from moisture absorption can be prevented.

INDUSTRIAL APPLICABILITY

The present invention enables the gas generator to be manufactured at low cost, by providing the reduced component count and the resultant improved assembling workability resulting from elimination of the need for the bypass preventing members used hitherto, while maintaining its performance capability of preventing the slag in the gas flowing outside of the cooling/filtering member.

What is claimed is:

1. A gas generator for air bags comprising:
   a housing formed by a cylinder with a plurality of gas exhaust openings, said housing being closed at its ends by an upper cap and a lower cap;
   an ignitor provided in said housing at a center portion thereof;
   a gas generating agent, provided in said housing at a location radially outside of said ignitor;
   a cooling/filtering member provided in said housing at a location radially outside of said gas generating agent to enclose said gas generating agent, and extending from the side of said upper cap to the side of said lower cap;
   an annular projection integrally formed on at least one of said upper cap and said lower cap so as to abut with an inner peripheral surface of said cooling/filtering member; and
   an annular space between said cooling/filtering member and a portion of said housing having said gas exhaust openings such that said exhaust openings face said cooling/filtering member in a radial direction via said annular space, wherein the radial width of the space is set to be circumferentially uniform in at least a location of the gas exhaust openings.

2. A gas generator for air bags as set forth in claim 1, wherein said side cylinder and said upper cap are integrally formed and said side cylinder and said lower cap are joined to each other by friction welding to form said housing.

3. A gas generator for air bags as set forth in claim 1, wherein said side cylinder and said upper cap are integrally formed and said side cylinder and said lower cap are joined to each other by welding to form said housing.

4. A gas generator for air bags as set forth in any one of claims 1 to 3, wherein a space is formed between said cooling/filtering means and said side cylinder.

5. A gas generator for air bags as set forth in any one of claims 1 to 3, wherein said housing is provided, around said igniting means, with a center cylinder for joining said upper cap and said lower cap.

6. A gas generator for air bags as set forth in claim 4, wherein said housing is provided, around said igniting means, with a center cylinder for joining said upper cap and said lower cap.

7. A gas generator for air bags as set forth in claim 1, wherein said cooling/filtering member has a wall thickness portion to abut with an inner wall surface of said side cylinder.

8. A gas generator for air bags as set forth in claim 1, wherein said gas exhaust openings are hermetically sealed with aluminum foil.

* * * * *